Nov. 19, 1929.  C. LE G. FORTESCUE  1,736,435
PROTECTIVE SYSTEM FOR ELECTRICAL APPARATUS
Filed Sept. 26, 1925

WITNESSES:
C. J. Weller.
E. R. Evans

INVENTOR
Charles Le G. Fortescue.
BY
Wesley G. Carr
ATTORNEY

Patented Nov. 19, 1929

1,736,435

UNITED STATES PATENT OFFICE

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA

PROTECTIVE SYSTEM FOR ELECTRICAL APPARATUS

Application filed September 26, 1925. Serial No. 58,816.

My invention relates to protective systems for electrical apparatus and particularly to a differential relay system responsive to an unbalance of the symmetrical components of an electrical quantity.

One object of my invention is to provide differential protection for an electrical translating device that is responsive to an unbalance in the magnitudes of the negative phase-sequence components of the input and output currents or of similar symmetrical components.

A further object of my invention is to provide a differential relay for a polyphase translating device that will be operative in case a fault occurs on any of the windings of said device.

Figure 1:
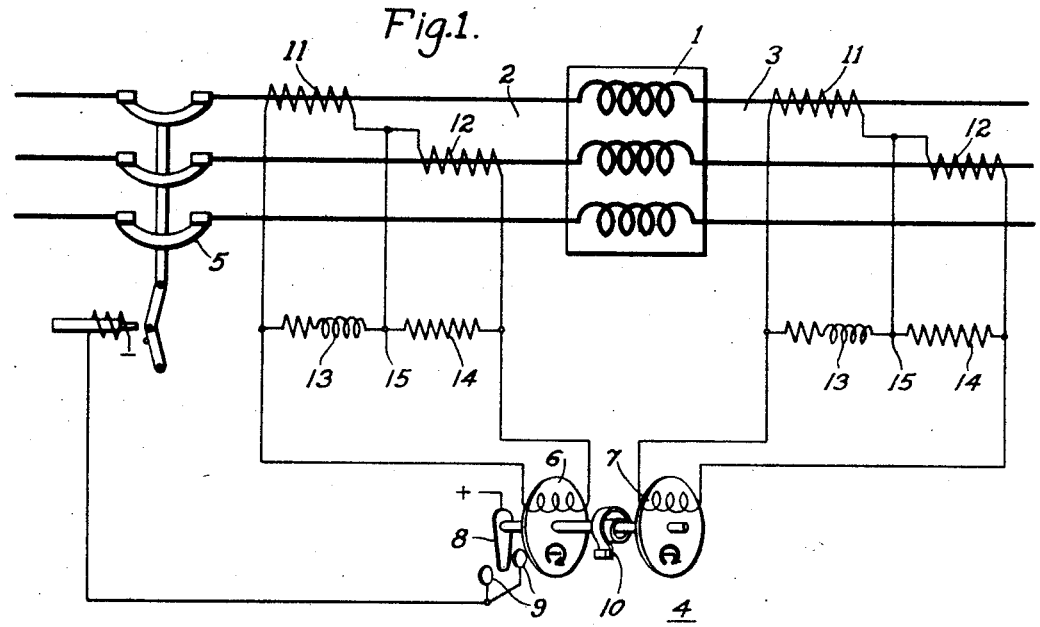
Figure 2:
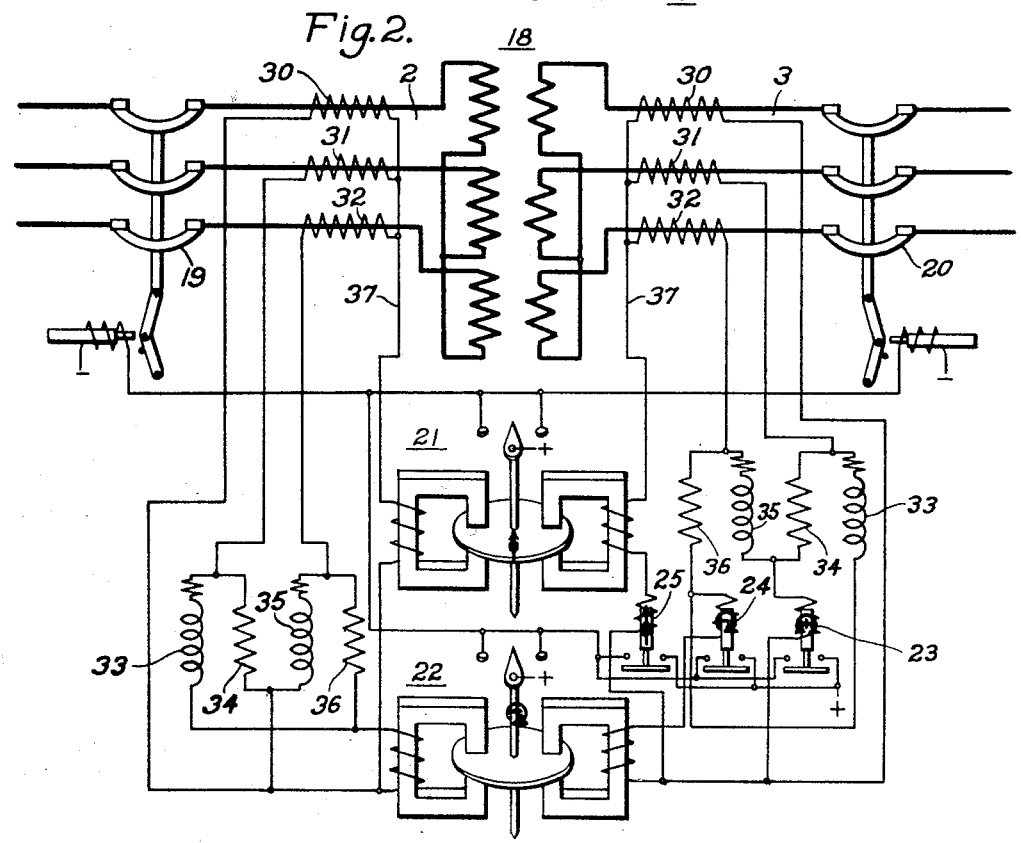

For a clearer understanding of my invention, reference may be had to the accompanying drawings in which Figure 1 is a diagrammatic view of an electrical system embodying my invention, and Fig. 2 is a similar view of a modification thereof.

Referring to Fig. 1, an electrical system comprises a translating device 1, such as a generator or a transformer, polyphase input and output circuits 2 and 3, respectively, for said device and a differential relay 4 for controlling a circuit-interrupter 5 to interrupt the input circuit 2.

The differential relay 4 comprises two opposing elements 6 and 7, which may be induction-motor driving elements or similar electromagnetic actuating elements connected in opposition. A movable contact member 8, controlled by the differential elements 6 and 7, is adapted to cooperate with stationary contact members 9 in the tripping circuit of the circuit-interrupter 5. A spring 10 normally maintains the contact member 8 in a central position out of engagement with either of the stationary contact members 9.

The differential elements 6 and 7 of the relay 4 are so connected to the translating device 1 as to be actuated in accordance with the negative phase-sequence components of the currents traversing the input and output circuits respectively. In the drawing is shown, by way of example, one means for accomplishing this result, comprising two current transformers 11 and 12 connected in series relation with two phase conductors of the circuit and two equal impedances 13 and 14 connected across the secondary windings of the current transformers. One terminal of each of the impedances 13 and 14 is connected to a common point 15, and the winding of the relay element is connected across the other terminals of the impedances. If desired, other methods of segregating a symmetrical component of an electrical quantity of the circuit may be employed, such as those illustrated in U. S. Letters Patent 1,535,587–9 and 1,535,593, dated April 28, 1925.

I have illustrated, by way of example, my invention applied to a three-phase circuit and, therefore, one of the impedances 14 may be a resistor and the other impedance 13 a combined resistor and reactor of such phase characteristics that the voltage thereacross leads the current traversing the same by 60°. The two impedances 13 and 14 are so connected to the polyphase circuit that the voltages across the respective impedances are exactly opposite in phase under balanced conditions in the circuit.

Since the absolute values of the impedances 13 and 14 are equal, under balanced conditions in the circuit, no current traverses the relay elements 6 and 7, and under unbalanced conditions, each of the said elements is traversed by a current that is proportional to the negative phase-sequence component of the currents in the input and the output circuits of the translating device 1, respectively. For polyphase systems having a different number of phases, the characteristics of the impedances 13 and 14 are changed as required to obtain the negative phase-sequence component.

In case a fault occurs upon the windings of the translating device 1, the differential elements 6 and 7 will become unbalanced by reason of the fact that the negative phase-sequence components of the currents in the input and the output circuits become unequal. The relay 4 will close its contact members 8 and 9 and open the circuit-interrupter 5, thereby disconnecting the translating device 1 from the source of current. However, if a fault occurs upon the output circuit 3 beyond current transformers 11 and 12, the values of the negative phase-sequence components of the currents in the output and input circuits of the translating device 1 will remain of substantially the same value and the differential relay 4 will not be operated.

The differential relay 4 will be operatively energized upon the occurrence of a fault upon any of the several windings of the polyphase translating device 1. Accordingly, a material saving is effected by the use of my invention over the usual differential relay connections which require a plurality of relays in order to provide protection for each of the several phase windings.

In Fig. 2 is shown a modification of my invention in which the translating device is shown as a three-phase transformer 18. Circuit-interrupters 19 and 20 are provided in the input and output circuits of the transformer 18 and are operated in case a fault occurs upon the windings of the said transformer to disconnect the transformer from both the input and output circuits. The circuit-interrupters 19 and 20 are controlled by a zero phase-sequence differential relay 21, a negative phase-sequence differential relay 22 and positive, negative and zero phase-sequence relays 23, 24 and 25. The differential relays are connected to the input and the output circuits 2 and 3 of the transformer 18 and relays 23, 24 and 25 are connected to the output circuit 3.

In the modification which is illustrated in this figure of the drawing, the network for segregating the positive, negative and zero phase-sequence components of the current traversing the circuit comprises three-current transformers 30, 31 and 32 in series relation with the respective phase conductors of the circuit and four equal impedances 33, 34, 35 and 36 connected between the secondary windings of the current transformers and the respective relays.

By properly proportioning the impedances the desired symmetrical component, such as the positive or negative phase sequence component, may be segregated and impressed upon the associated relay. The relays are provided with windings designed to have the necessary impedance characteristics to respond most accurately to the values of the components which may be expected to exist in the circuit under various conditions so far as they may be controlled by the impedance of the circuit conductors and the connected apparatus. Adjustments may, of course, be provided for, depending upon the design of the relays. The impedance of the windings will depend upon the impedance values which are selected for the impedance devices. All of these will be selected, of course, with the view of obtaining a desired torque in the relays and the design will be limited only by the permissible or desired limit of losses according to ordinary engineering design principles.

While for the sake of simplicity I refer to the relays as positive phase sequence, negative phase sequence or zero phase sequence, it will be understood that they respond to such phase sequence currents because they are connected to a system of impedances which segregate such currents and supply them to the relays.

The windings of the zero phase-sequence relays 21 and 25 are connected in series relation with the common conductors 37 of the three current transformers through which the residual or zero phase-sequence current flows.

The negative phase-sequence relays 22 and 24 are connected between the secondary winding of the current transformer 30 and the secondary windings of the current transformers 31 and 32 in parallel, the impedances 33 and 36 being connected in the parallel branches of this circuit. The impedances 33 and 36 have such phase characteristics that under balanced conditions in the polyphase circuit, no current traverses the relays 22 and 24, and, under unbalanced conditions, a current proportional to the negative phase-sequence component of current traverses these relays. The impedances 33 and 36 are of equal absolute magnitude and are of such phase characteristics that the voltages across the same are exactly opposite in phase when the currents traversing the polyphase circuit are balanced.

The positive phase-sequence relay 23 is connected between the secondary winding of the current transformer 30 in the output circuit 3 of the transformer 18 and the secondary windings of the current transformers 31 and 32 in parallel, the impedances 34 and 35 being connected in the parallel branches of said circuit. The impedances 35 and 34 are of equal absolute magnitudes and have such phase characteristics that the voltages across the same are exactly in phase when the currents traversing the output circuits are unbalanced.

The negative phase-sequence differential relay 22 operates in the same manner as relay 4 (Fig. 1) described above. The zero phase-sequence relay 21 operates in the same manner upon a ground fault in the winding of the transformer 18. If the system is a grounded system and one of the windings of the transformer 18 becomes grounded, a zero phase-sequence current flows in the input circuit 2 thereby operating the differential relay 21, although the relay 21 is not responsive to ground faults upon the output circuit 3. The relays 23, 24 and 25 are responsive to overloads, unbalanced currents and ground faults upon the output circuit 3 and should be adjusted to operate as desired with respect to the capacity of the transformer 18.

The differential relays 21 and 22 may be adjusted to operate instantaneously upon relatively small zero and negative phase-sequence currents, thereby providing sensitive protection for the transformer 18 and permitting the transformer to be disconnected from the circuit before a relatively slight fault has developed into an arc that will damage the transformer winding. The relays 23, 24 and 25, however, may be provided with a time element, if desired, because of the ability of the transformer 18 to carry large momentary overloads without damage thereby permitting the fault to burn out or be cleared by the operation of other circuit-interrupters adjacent to the faulty section of the system and permitting the service to be continued upon the remainder of the system.

The translating means 18 is represented as being a star-star transformer bank. It is obvious, however, to anyone skilled in this art, that this transformer may also be star connected, having its neutral grounded. In such an event, obviously, the zero-sequence relay 21 could be omitted, and the time-element relay 25 could be relied upon to operate in the event of an internal ground, while, in the event of an external ground, this relay would offer a time lag in its operation and permit external relays to operate.

Inasmuch as many changes may be made in the system shown on the accompanying drawings, without departing from the scope of my invention, I do not desire to be limited in scope except as may be indicated in the appended claims.

I claim as my invention:

1. A differential protective system for a translating device having input and output circuits including means connected to the input and the output circuits of said device for segregating the symmetrical phase-sequence components of current in said circuits and means operated in accordance with the relative values of corresponding components in the respective circuits.

2. A differential protective system for a transformer having input and the output circuits comprising circuit-interrupters in said circuits, means connected to the input and output circuits of said transformer for segregating the symmetrical phase-sequence components of current in said circuits and means for operating said circuit-interrupters upon the occurrence of an unbalance between corresponding components in the respective circuits.

3. A differential protective system for a transformer having input and output circuits including circuit-interrupters in said circuits, means for segregating the negative phase-sequence components of the currents in said circuits and means for operating said interrupters upon the occurrence of an unbalance between said components.

4. The combination with a translating device having electrical input and output circuits, of means operated in accordance with a symmetrical phase-sequence component of current in said circuit and means cooperating with said first means operated in accordance with a symmetrical component of the electrical output of said device.

5. The combination with a translating device having input and output circuits and means for disconnecting said device from the circuit, of a differential relay controlling said means and operated in accordance with a phase-sequence component of the input and output currents in said circuits of said device.

6. The combination with a transformer having input and output circuits and means for interrupting said circuits, of means for controlling said interrupting means in accordance with an unbalance in the symmetrical phase sequence components of current in said circuits and means for controlling said interrupting means in accordance with the magnitude of a symmetrical phase-sequence component of a quantity of the output circuit.

7. The combination with a translating device having input and output circuits and windings in said device to be protected against faults, of a differential relay, associated with the translating device, said relay being effective in accordance with the phase-sequence components of the input and output currents of said translating device.

8. The combination with a translating device to be protected against internal faults therein, and having input and output circuits, of normally balanced differential means actuated in accordance with the relative values of phase-sequence currents in said circuits.

9. The combination with a polyphase translating device having a plurality of windings to be protected, of a differential relay responsive to phase-sequence components of current derived from both the supply or input circuit and the load or output circuit of the translating device, and effective upon the occurrence of a fault relative to the translating device.

10. The combination with an electrical device having an input circuit energized from a source of power and an output circuit for said device, of means including a differentially-connected phase-sequence relay device energized in accordance with the phase-sequence components of current in said circuits for electro-responsively disconnecting the electrical device from the source of power when a fault occurs within the electrical device.

11. The combination with a power transformer to be protected, of means including a phase-sequence relay differentially-connected to the input and output circuits of the transformer and energized in accordance with the phase-sequence components of current in said circuits for electro-responsively isolating the transformer when a fault occurs within the transformer.

12. The combination with a polyphase circuit energized from a source of power, an electrical device to be protected against internal faults connected to the circuit, said device having an output circuit therefor, and circuit-interrupter means for isolating the device from the source of power, of interrupter-control means including means for segregating phase-sequence components of current from the circuits connected to both sides of the device, and means differentially responsive thereto.

In testimony whereof, I have hereunto subscribed my name this first day of September, 1925.

CHARLES LE G. FORTESCUE.